United States Patent
Knauerhase

(10) Patent No.: US 7,269,627 B2
(45) Date of Patent: Sep. 11, 2007

(54) ROUTING MESSAGES USING PRESENCE INFORMATION

(75) Inventor: Robert C. Knauerhase, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1139 days.

(21) Appl. No.: 09/917,300

(22) Filed: Jul. 27, 2001

(65) Prior Publication Data

US 2003/0023691 A1 Jan. 30, 2003

(51) Int. Cl.
 *G06F 15/16* (2006.01)
(52) U.S. Cl. .................. 709/206; 709/203; 709/217
(58) Field of Classification Search ................ 709/206, 709/203, 217, 219
 See application file for complete search history.

(56) References Cited

U.S. PATENT DOCUMENTS

| | | | | |
|---|---|---|---|---|
| 5,796,394 A * | 8/1998 | Wicks et al. ................ | 715/751 |
| 5,949,413 A | 9/1999 | Lerissa et al. | |
| 6,052,121 A | 4/2000 | Webster et al. | |
| 6,052,372 A | 4/2000 | Gittins et al. | |
| 6,260,148 B1 * | 7/2001 | Aggarwal et al. ............ | 726/14 |
| 6,301,609 B1 * | 10/2001 | Aravamudan et al. ...... | 709/207 |
| 6,643,650 B1 * | 11/2003 | Slaughter et al. ............. | 707/10 |
| 6,691,162 B1 * | 2/2004 | Wick .......................... | 709/224 |
| 2001/0013069 A1 | 8/2001 | Shah | |
| 2002/0160757 A1 * | 10/2002 | Shavit et al. ................ | 455/414 |
| 2002/0178227 A1 * | 11/2002 | Matsa et al. ................ | 709/206 |
| 2003/0046421 A1 * | 3/2003 | Horvitz et al. .............. | 709/238 |
| 2006/0015606 A1 * | 1/2006 | Gebhardt et al. ........... | 709/223 |

FOREIGN PATENT DOCUMENTS

| | | |
|---|---|---|
| EP | 1104964 | 6/2001 |
| EP | 1104965 | 6/2001 |
| WO | WO9816045 * | 4/1998 |
| WO | WO 00/69143 | 11/2000 |
| WO | WO 01/22258 | 3/2001 |
| WO | WO 01/41477 | 6/2001 |
| WO | WO 01/43357 | 6/2001 |

* cited by examiner

*Primary Examiner*—Abdul Lahibalad
*Assistant Examiner*—LaShonda Jacobs
(74) *Attorney, Agent, or Firm*—Fish & Richardson P.C.

(57) ABSTRACT

Routing a message (e.g., text message, voice message, etc.) based on the accessibility of an intended recipient's associated communication channels (e.g., email, fax, instant message, cell, landline, etc.) may involve discovering information relating to an accessibility state of one or more communication channels associated with the message recipient; maintaining a data repository comprising the discovered accessibility state information; and routing a message to the message recipient based on information in the data repository.

21 Claims, 6 Drawing Sheets

ROUTING MESSAGES USING PRESENCE INFORMATION

BACKGROUND

The present application describes systems and techniques for routing messages to recipients based on "presence" information—e.g., information that describes or otherwise relates to a recipient's accessibility via one or more communication channels. As used herein, a "message" refers to virtually any type of communication that can be transmitted from one endpoint to another over one or more communication channels.

FIG. 1 is a block diagram of a typical network environment in which messages can be communicated among users of the network. As shown therein, users may connect to a packet-switched computer network 100, such as a Local Area Network (LAN) or Wide Area Network (WAN), via computer platform endpoints such as laptop 101, workstation 102 or personal computer (PC) 103. The LAN/WAN 100 may be connected via one or more gateways 107 to other types of endpoints such as a cell phone 104, a handheld computer 105 (e.g., a Personal Digital Assistant (PDA)), or a landline telephone 106 on the Public Switched Telephone Network (PSTN). The communication links 108 connecting the endpoints 101-106 to the LAN/WAN 100 or the gateway 107 may be wired or wireless.

Communication among endpoints 101-106 may be accomplished by sending messages using any of several different techniques and/or media. For example, a user at endpoint 101 may send a text message—e.g., either an e-mail message or an "instant message" (IM)—to another user at endpoint 102 via LAN/WAN 100. Typically, e-mail messages are viewed at the message recipient's convenience by affirmatively selecting a message to be read in a client application running on the user's computer platform. IMs, in contrast, are messages that, if enabled, typically appear instantaneously in a pop-up window on the recipient's monitor.

As further examples, a user at endpoint 101 may send a text message to a user at cell phone 104 or handheld computer 105 and/or may send a voice message (e.g., using Internet Protocol (IP) telephony) to a user at cell phone 104, handheld 105 or landline telephone 106. In general, virtually any endpoint that can connect to a communications network can send messages to any other endpoint connected to the network.

DRAWING DESCRIPTIONS

Details of one or more embodiments are set forth in the accompanying drawings and the description below. Other features, objects, and advantages will be apparent from the description and drawings, and from the claims.

DETAILED DESCRIPTION

Figure 1:
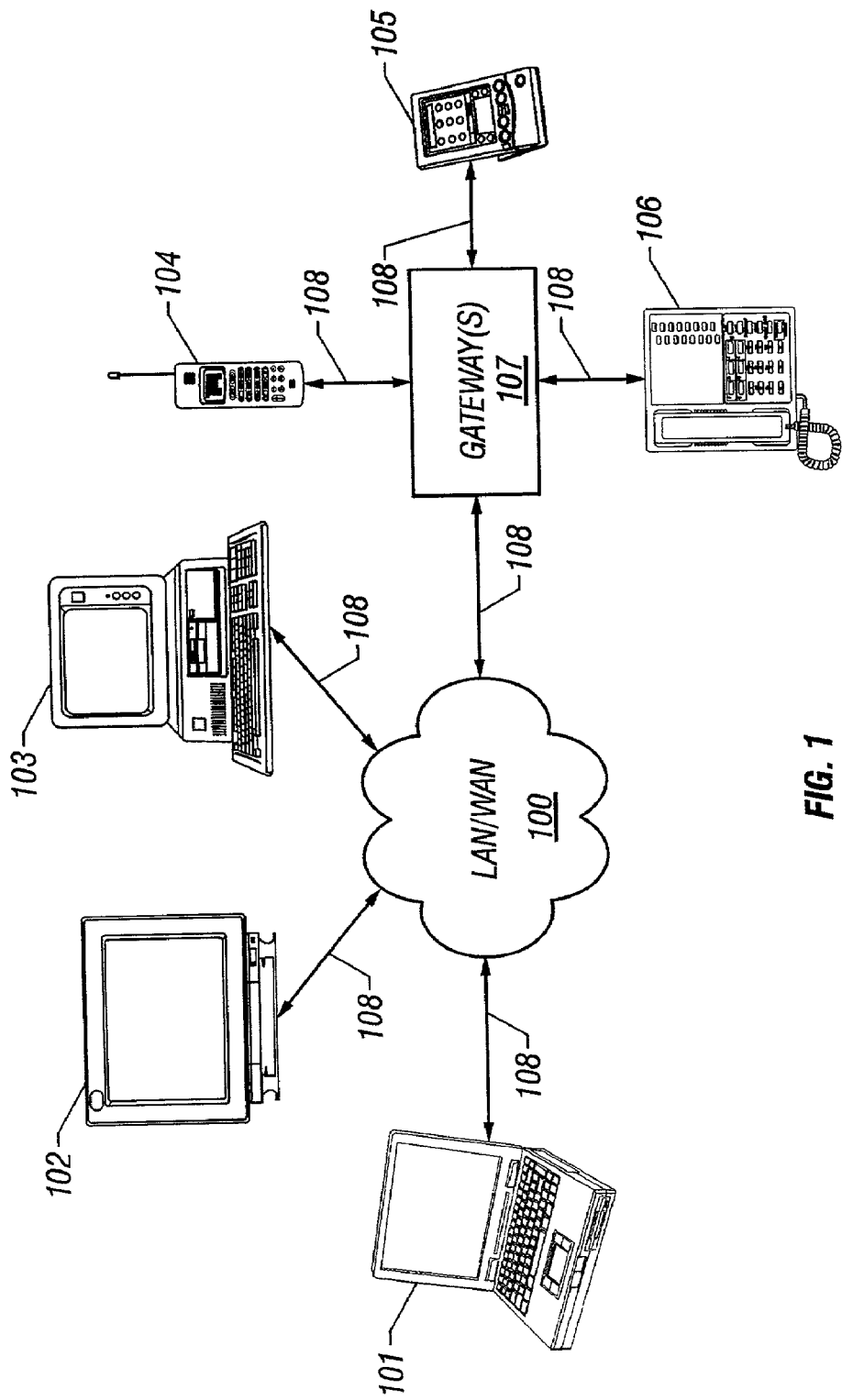
FIG. 1 is a block diagram of a typical network environment in which messages can be communicated among users of the network.
Figure 2:
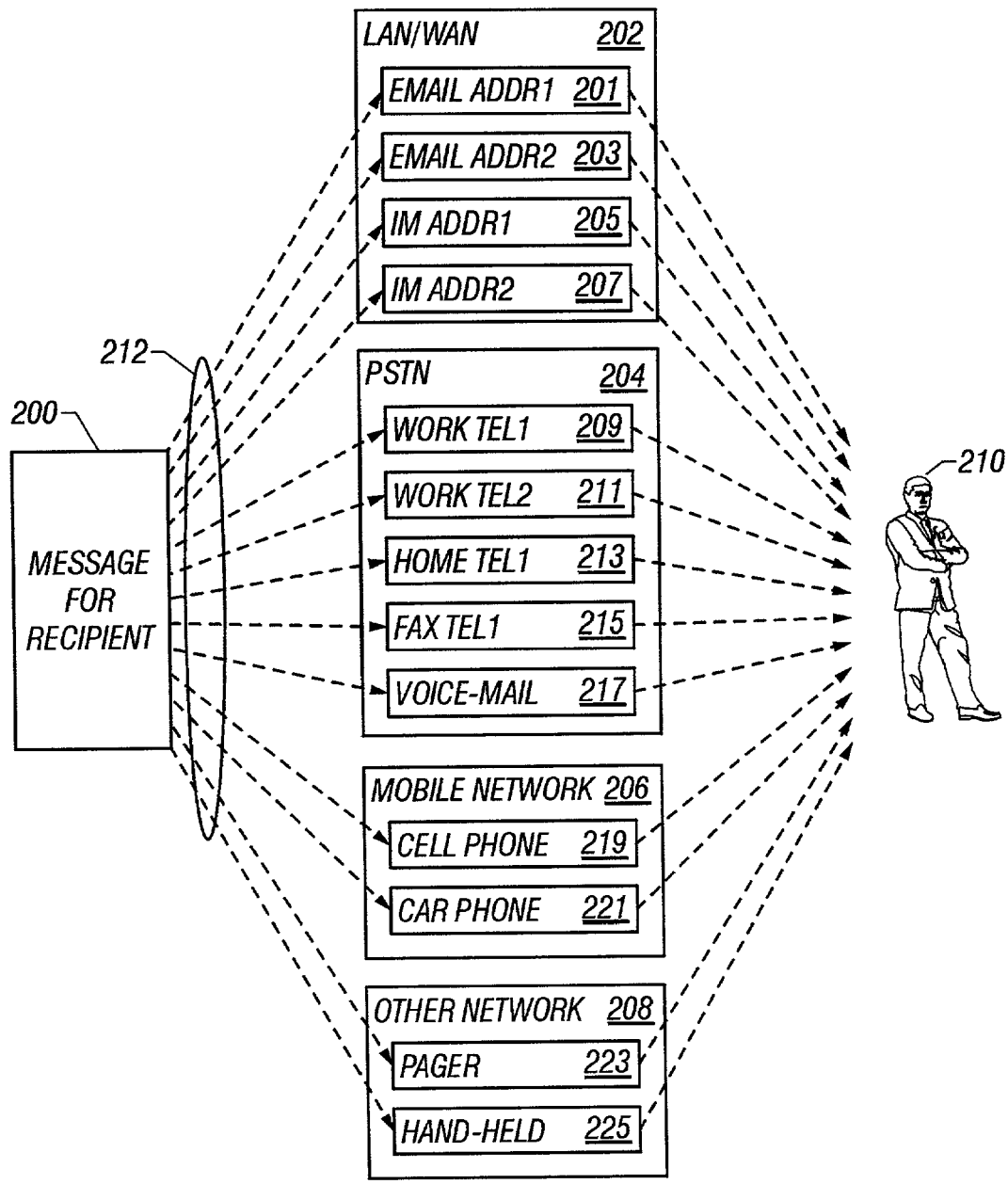
FIG. 2 shows an example of potential paths over which a message can be routed to a recipient.

Typically, a single user may have several different associated communication channels through which the user can receive messages from other users. For example, a user "Rob" may have multiple e-mail addresses, multiple IM addresses, multiple landline telephone numbers, multiple cell phone numbers, and one or more fax numbers, pager numbers, and the like, any one or more of which may be used to route messages to Rob. As shown in FIG. 2, for example, a message 200 intended for a recipient 210 can be sent over any of one or more of 13 different comniunication channels 212 (such as communication channels associated with (i) a LAN/WAN 202 which may, for example, include a first e-mail address 201, a second e-mail address 203, a first instant messaging address 205, a second instant messaging address 207; (ii) a PTSN 204 which may, for example, include a first work telephone number 209, a second work telephone number 211, a home telephone number 213, a fax telephone number 215, a voicemail number 217; (iii) a mobile network 206 which may, for example, include a cell phone number 219, a car phone number 221; and/or (iv) other networks 208 which may, for example, include a pager number 223 or an address associated with a hand-held 225. Either the sender or the recipient may desire that the message be sent over more than one of the channels 212 for the sake of redundancy or persistence. Typically, the sender chooses which of the channels the message is to be sent over. To do so, however, the sender must know and keep track of the recipient's various device addresses (e-mail address, telephone number, etc.), which depending on the particular recipient can represent a voluminous amount of information.

Moreover, depending on the recipient's location or circumstances, the channel or channels designated by the sender may turn out to be less than ideal for a variety of reasons. For example, the recipient may be unreachable over the designated channel because of a service outage or other lack of communications connectivity. As an example, if the sender chooses to send an instant message to the recipient's wireless hand-held computer via channel 225, it may not be possible to deliver the message in a timely manner if the recipient is outside of the wireless reception range. Moreover, even if reachable via the chosen channel (e.g., communications connectivity exists), the recipient may nonetheless be unavailable if, for example, the recipient does not have the IM client currently running on his hand-held computer or has otherwise indicated an unwillingness to communicate via that communication channel.

Accordingly, systems and techniques as described herein have been developed that enable a sender to send a message to a recipient's identity rather than, e.g., one or more device addresses associated with the recipient, and further that optimally and intelligently route the message to the recipient over one or more communication channels based on presence information, which indicates the recipient's state of accessibility via the various communication channels. As a result, messages may be addressed and routed to recipients with dramatically increased ease, flexibility, and/or situational appropriateness.

Figure 3:
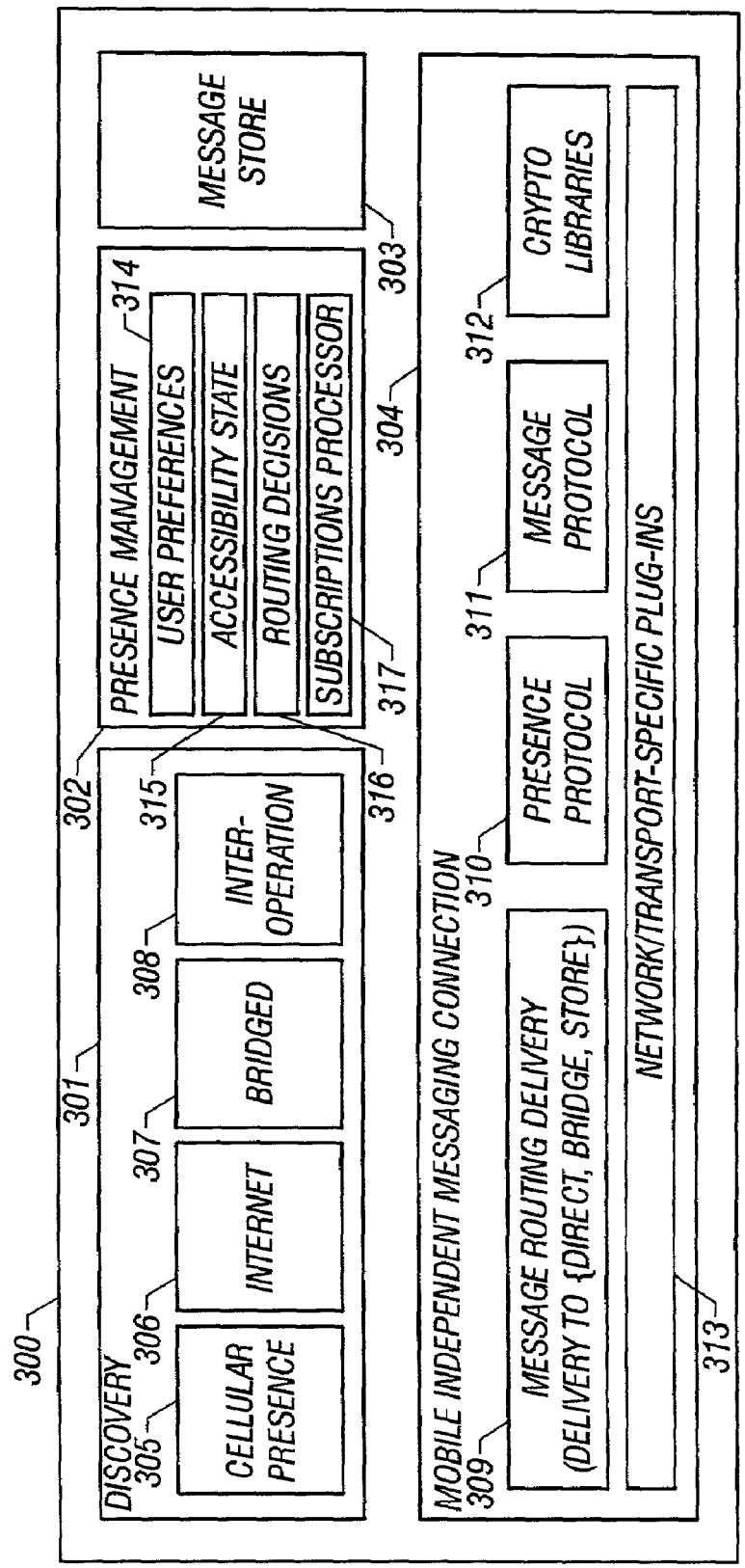
FIG. 3 is a block diagram of an architecture that may be used to route messages to recipients based on presence information.

FIG. 3 is a block diagram of a presence routing architecture 300 that may be used to route messages to recipients based on a recipient's identity and on presence state information indicating the recipient's accessibility via the various communication channels over which messages may be received. As shown in FIG. 3, the presence routing architecture 300 may be formed of four components 301-304, typically implemented as software entities residing and/or executing on one or more networked computer platforms.

The Discovery component 301 may be responsible for discovering and/or collecting information relating to the accessibility state for each of a recipient's potential communication channels. As used herein, "accessibility" encompasses both the "reachability" of a message recipient via a given communications channel and the "availability" of the recipient on the channel under consideration. A recipient is deemed to be "reachable" on a channel if there is communications connectivity for the channel—that is, if a signal path exists between the sender and the recipient over the channel under consideration. Availability, on the other hand, refers to the readiness and willingness of the recipient to receive messages. As an example, a recipient who has his cell phone turned on and is within cell signal range, but who has the phone's ringer turned off, is "reachable" via his cell phone channel (because a signal path exists to receive calls) but is "unavailable" to receive messages because he will not be alerted to, and thus not answer, incoming calls.

The Discovery component 301 may seek to determine, and continuously or periodically update, the accessibility state of each of a recipient's potential communications channels. A channel's accessibility state is a snapshot of the reachability and/or availability of the recipient via that channel.

The Discovery component 301 may have four basic subcomponents—Cellular presence discovery 305, Internet discovery 306, Bridged discovery 307, and Inter-operability discovery 308—each of which represents a different avenue for discovering information about the respective accessibility states of a recipient's communications channels.

The Cellular presence discovery subcomponent 305 is used to discover accessibility state information based on a user's cell phone usage. For example, when a user turns on and/or uses his cell phone while within cell signal range, data packets are transmitted from the cell phone to the cellular service provider's computer system. From the received data packets, the cell provider's computer system may determine at least the following information: (1) whether or not the user's cell phone is turned on; (2) whether or not the cell phone is currently in use; and (3) the approximate geographic location of the cell phone (i.e., the cell in which the phone is located). This information can be transmitted from the cell provider's computer system to the computer system on which the Discovery component 301 resides and stored for use in making future routing decisions, as described below.

The Internet discovery subcomponent 306 may be responsible for discovering accessibility state information for Internet-based communication channels, for example, communication channels that use IP addresses or equivalent for addressing (e.g., e-mail, IM). Component 306 can discover Internet-based accessibility state information in a number of ways. For example, subcomponent 306 can ping an IP address to see if it responds, and in that way discover information about the reachability of the communication channel associated with the pinged IP address. Component 306 also can check with e-mail and IM servers connected to the Internet to see if a user is currently logged into, and thus presently available via, the associated e-mail or IM system. In addition, component 306 can receive user-supplied availability information such as a "do not disturb" or "away from office" indicator flag set by a user within an IM client application.

Figure 4:
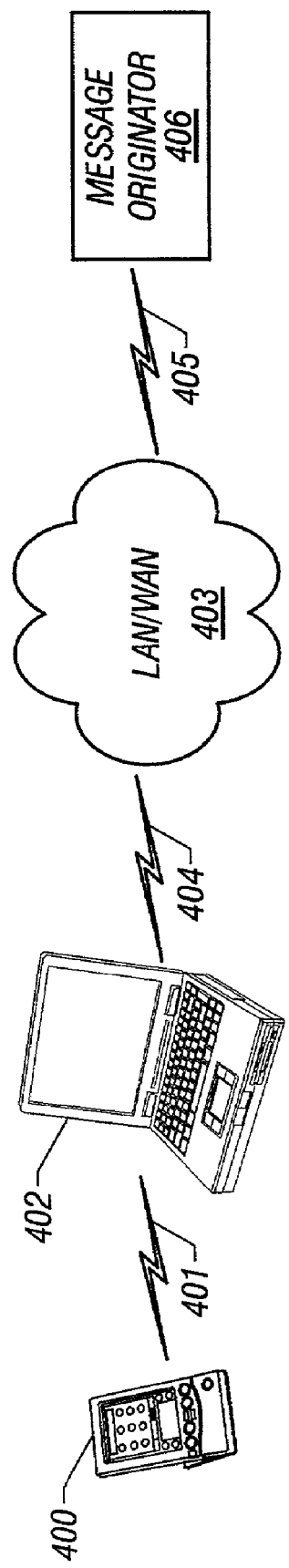
FIG. 4 shows an example of routing a message to a recipient using a bridge device.

The Bridged discovery subcomponent 307 may be responsible for discovering accessibility state information for a potential recipient through indirect routes—for example, through one or more other user's communication channels. FIG. 4 shows an example of a bridged communication channel in which a laptop computer 402 serves as a bridge device to form a bridged connection between a user's hand-held computer 400 and a LAN/WAN 403. A "bridged connection" as used herein is one that passes through an intermediate recipient's device and/or is sent to an address associated with an intermediate recipient before the message ultimately is delivered to the intended recipient. In contrast, a "direct connection" is one that is delivered directly to the intended recipient without first be routed through one or more intermediate recipients. Although the bridged connection shown in FIG. 4 involves only a single bridging device (laptop 402), a bridged connection potentially could include two or more bridging devices either in a serial arrangement (for bridge connections having two or more hops between the recipient device and the LAN/WAN) or a parallel arrangement (for bridge connections with redundant links).

For the purposes of this example, assume that the Bridged discovery subcomponent 307 is interested in discovering accessibility state information about a potential recipient's hand-held computer 400. Assume further that hand-held computer 400 happens to be in the proximity of laptop computer 402 (belonging either to another user or to the same user associated with hand-held computer 400) that has a communications link 404 (e.g., wireless Ethernet) to LAN/WAN 403 and further that hand-held computer 400 has a communications link 401 (e.g., a Bluetooth-based link or other radio frequency (RF) wireless link) to laptop 402.

Accordingly, the Bridged discovery subcomponent 307 may discover (either by interrogating laptop 402 or by laptop 402 or hand-held 400 reporting the presence of hand-held 400 upon establishment of communications link 401) that the recipient associated with hand-held 400 is accessible over a bridged connection through laptop 402 and thus can receive messages, e.g., from a message originator 406 connected to the LAN/WAN 403 by communications link 405. The ongoing presence or sudden absence of hand-held 400 may be monitored by the Bridged discovery subcomponent 307 by requiring the hand-held 400 to continuously or periodically transmit a data packet via laptop 402, the receipt of which indicates the hand-held's continued accessibility via the bridged connection. Alternatively, a wireless transmission protocol such as Bluetooth, which sends registration and deregistration packets when initiating and terminating a connection, respectively, could be used to monitor the accessibility of the hand-held via the bridged connection. In addition, information relating to the hand-held user's availability to receive messages could be transmitted back to the Bridged discovery subcomponent 307 via the bridged connection.

Returning to FIG. 3, the Discovery component 301 also may include an Interoperation discovery subcomponent 308 for discovering accessibility information about a recipient's communication channels among interoperating messaging systems. For example, a user may have accounts on two or more different IM networks that facilitate interoperation between them (e.g., a user on IM network X can send/receive IMs to/from a user on IM network Y). Interoperation discovery subcomponent 308 may discover information relating to the accessibility of a user on such interoperating systems.

The presence routing architecture 300 also may include a message store 303 configured to store messages pending delivery. The message store 303, which may be implemented as a database system or, more generally, using any data repository formats or mechanisms deemed suitable by the system designer, may serve either as a temporary pigeonhole for storing messages while a routing decision is being made, or may store the messages more persistently, for example, if a recipient is determined to be unavailable over any of the recipient's potential communication channels.

The presence routing architecture 300 also may include a Presence Management component 302 that persistently stores information relating to accessibility state and presence, and uses the information to make intelligent message routing decisions. The Presence Management component 302, which may be implemented as a database management system (DBMS) or, more generally, using any data repository formats or mechanisms deemed suitable by the system designer, may have four subcomponents: a user preference subcomponent 314 for storing user preferences for receiving messages over various communication channels, a state subcomponent 315 for storing accessibility state information for each of the user's communication channels, a routing subcomponent 316 for making message routing decisions based on the collected accessibility and presence information, and a subscription processor 317. Other users (e.g., either human users or automated processes) may subscribe to the subscription processor 317 to receive automatic notification of changes to a user's presence information. For example, when the discovery component 301 notices a change in a user's (e.g., Rob's) reachability or availability, the subscription processor 317 composes and provides notification of the change to all other user's who have subscribed to Rob's presence information. This allows those subscribing users to maintain an updated copy of Rob's presence information, which enables the subscribing users to know ahead of time, for example, whether an IM to Rob will be instantly delivered as opposed to being stored.

The pseudo-code shown in Table 1 below (code segments are indicated by italics; comments are preceded by "//") relates to a basic routing procedure that may be used by the routing subcomponent 316, which may be implemented, for example, as one or more software processes executing on a computer system.

As indicated by the pseudo-code, the routing procedure first accepts a message, m, intended for a recipient and parses it, among other reasons, to identify the recipient (specified by "m.toID"). If the recipient is not reachable ("!reachable"), meaning, e.g., that the recipient has no communication channels that currently have connectivity to a communications network, the message is stored for later. Similarly, if the recipient is unavailable ("!available") the message is stored for later, for example, until the recipient becomes reachable and available.

Lastly, if the recipient is determined to be both reachable and available, the procedure determines whether a direct connection is available to that recipient and, if so, the direct connection is used to transport the message ("send(m)"). If, on the other hand, a direct connection is unavailable, a bridged connection is used to transport the message to the recipient ("sendViaBridge(m)"), for example, by routing the message through an intermediate recipient who has an associated device that is in communication with the intended recipient's communication device.

TABLE 1

```
m = acceptMessage( );
parseMessage( );
// See if recipient is reachable; if not, store msg for later
    if (!reachable(m.toID))
        storeForLater(m);
// See if recipient is available; if not, store msg for later
    if (!available(m. toID))
        storeForLater(m);
// Recipient is reachable & available; send msg via direct
// connection if available; otherwise, use bridged connection
    if (m.isDirect( ))
        send(m);
    else
        sendViaBridge(m);
```

The presence routing architecture 300 also may include a Mobile Independent Messaging Connection component 304, which represents a transport-independent connection subsystem for routing messages to a desired identity. In operation, the Mobile Independent Messaging Connection component 304 may receive a message to be delivered over a communications channel determined by the Presence Management component 302 and then may deliver the message to the specified destination. Component 304 may include five subcomponents including a message routing subcomponent 309 for delivering messages to a direct connection, a bridged connection, or for storing in the Message Store 303, a presence protocol component 310 for identifying the intended recipient of the message and adding appropriate high-level routing information (e.g., presence-level information) to the message so that it will be directed to the intended recipient, a message protocol component 311 for adding low-level routing information (e.g. transport-layer level information such as Multipurpose Internet Mail Extensions (MIME) information) to the message so that it can be transported to the intended recipient, cryptography libraries 312 including, for example, public keys for authentication and encryption purposes, and network/transport-specific plugins 313. The Mobile Independent Messaging Connection component 304 hides details of communication specifics from messaging applications in order to accommodate changes in network connectivity of recipient devices.

Figure 5:
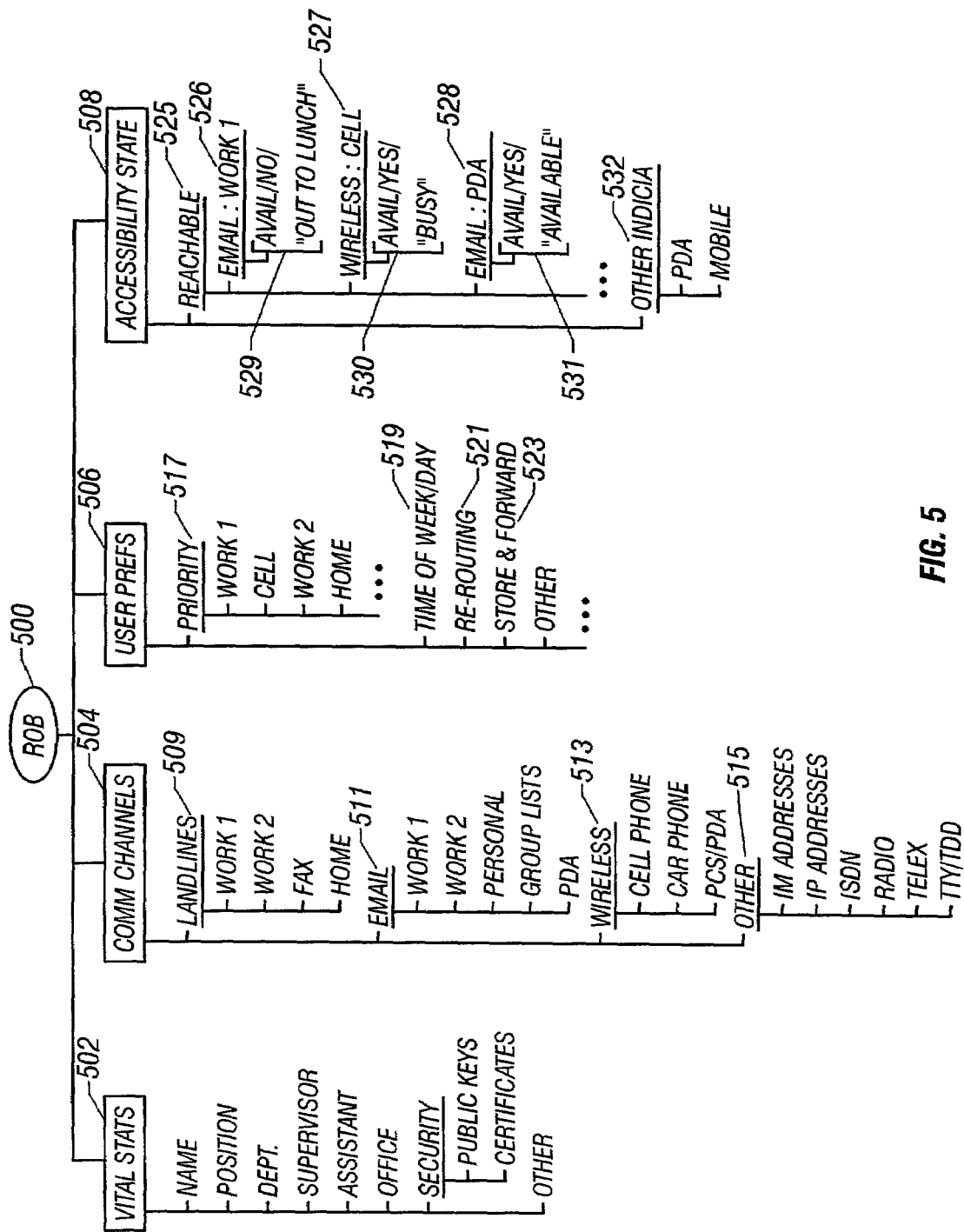
FIG. 5 shows an example of a data structure that may be used to maintain a user's preferences and presence state information.

FIG. 5 shows an example of a data structure that may be used to store a user's preferences relating to the user's communication channels. Such user preference and accessibility state information may be collected and maintained, for example, in the Presence Management component 302 in the architecture 300 of FIG. 3. The arrangement and types of data depicted in FIG. 5 are provided for explanatory purposes. Virtually any other arrangement and types of user preference and/or accessibility state data could be collected and stored using any suitable data repository framework. In general, availability is a subset of reachability—that is, if a communication channel is determined to be reachable, then availability for that channel can be tracked. Alternatively, availability information may be stored for each potential communication channel, regardless of whether or not the channel is currently reachable. For example, the availability of channel not currently reachable could be set to whatever value was applicable when the channel was last reachable. In one implementation, reachability and availability states for each channel are stored as binary values (yes/no or 1/0), with a string (e.g., "busy," "out to lunch," "available") associated with, and potentially qualifying, the availability of a channel.

As shown in FIG. 5, a data structure 500 for a particular user, Rob, (a potential message recipient) may include information such as the user's Vital Statistics 502, potential Communication Channels 504 associated with the user, User Preferences 506, and Accessibility State 508, which represents the user's current state of presence on the various communication channels. The items of information stored in structure 500, or various combinations thereof, may be used by the Routing Decisions component 316 (see FIG. 3) to make intelligent routing decisions to help ensure that messages intended for the user reach him in a timely or otherwise appropriate manner.

In one implementation, intelligent routing decisions may be made by reference to the Accessibility State information 508, which in this example includes information indicating which of Rob's communication channels are currently Reachable 525. In this example, user Rob is reachable through three different communication channels—email: work1 526, wireless:cell 527 and email:pda 528, each of which has associated availability information indicated at availability fields 529, 530 and 531, respectively. Availability field 529, for example, indicates that although Rob is reachable through his work 1 email account, he is not available because, as indicated by the string in field 529 he is "out to lunch." Availability field 530 in contrast indicates that Rob is available to communicate on his cell phone but that he is "busy" meaning, for example, that he may or may not answer an incoming call or message. Availability field 528 indicates that Rob is available to receive email messages on his PDA and, further, includes the string "available." The availability strings in fields 529-531 may be derived from any of several different sources. For example, the availability strings could be input by the user himself or they could be inferred based on the user's actions or from other accessibility state information known about the user.

Depending on implementation and design preferences, the Routing Decisions component 316 (see FIG. 3) may, in one example, interpret the relative availability information indicated in fields 529-531 to decide that Rob's preferred communication channel to receive messages at this point in time is to send a message intended for Rob as an email message to Rob's PDA. However, other factors, such as Rob's user preferences 506 or presence information gleaned from other sources, could be used to override or influence the Routing Decision component's routing decision.

The Accesibility State 508 also may include information (not shown) relating to whether a particular communication channel is reachable by a direct connection or by a bridged connection or both. Accessibility State 508 also could include Other Indicia 532 that may affect routing decisions, such as user-supplied information (e.g., an "Away from Desk" or "Don't Bother Me Now" indicator flag set by user) or information inferred or received from other sources (e.g., an indication from the user's cell provider that the user currently is on his cell phone and/or at a location outside his office). As noted above, the Accessibility State information 508 may be updated as frequently as new information is available.

In other implementations, the Routing Decisions component may make intelligent routing decisions based not only the Accessibility State information 508, but also based on other information that could affect the ultimate routing decision. For example, Vital Statistics 502 stored in structure 500 may include details such as the user's name, position, department, supervisor's name and contact information, assistant's name and contact information, security information such as the user's public keys or certificates, and/or any other personal information about the user. All or part of this information may be used by the Routing Decisions component to aid in making routing decisions for messages intended for the user. For example, assume that Rob is in a meeting with his supervisor in his supervisor's office (which information might be gleaned from the user's online scheduling program). In that case, the Routing Decisions component might decide to route a message to Rob via a less obtrusive communications channel (e.g., an email sent to Rob's PDA) rather than a more obtrusive communications channel (e.g., a text message sent to Rob's pager, which rings upon receipt of pages) so as not to interrupt the meeting. On the other hand, if Rob was out to lunch, the Routing Decisions component might decide to use a more obtrusive communications channel so as to better get Rob's attention.

In the example shown, user Rob has several potential communication channels 504 over which he may receive messages. These include various landline telephone numbers 509 (work, home, fax); email addresses 511 (work, personal, etc.); wireless telephone numbers 513 (e.g., cell phone, car phone); and Other communication channels 515 such as IM addresses and the like. The Routing Decisions component may use one or more of these potential communication channels, depending on accessibility state and other information such as user preferences, to make routing decisions. Moreover, other users seeking to send messages to Rob need not (but may) specify a particular communications channel, but rather may simply address the message to a unique, communications device-independent identity associated with Rob and thus give the Routing Decisions component the choice of which communications channel to use (subject, for example, to accessibility state and user preferences). Consequently, because routing decisions may be made by an intelligent routing algorithm based on collected information, messages sent to Rob's identity may be more likely to reach him in a timely and/or context-appropriate manner than if left to the sending user's choice of communication channels. Moreover, sending users may no longer be required to know and keep track of the addresses and/or numbers associated with Rob's various communication channels in order to use those channels to send Rob a message. Accordingly, record-keeping of correspondents' various contact information items may be dramatically simplified.

Intelligent routing by the Routing Decisions component also may be based on the User Preferences 506 stored in structure 500. These preferences may either be collected based on input received from the user, or may be inferred from the user's past actions or habits. For example, user Rob may have specified a priority scheme 517—e.g., an order of preference in which his various communications channels should be used depending on accessibility—that is to be used by the Routing Decisions component. User preferences also may specify the time of week/day 519, which may be used to adjust the specified priority scheme 517 (e.g., Rob may specify different priorities for evenings and weekends), or further may include parameters that may affect routing decisions such as re-routing information 521 (e.g., where to send failed messages), store & forward information 523 (e.g., which message store to use, how long messages should persist), and the like.

Figure 6:
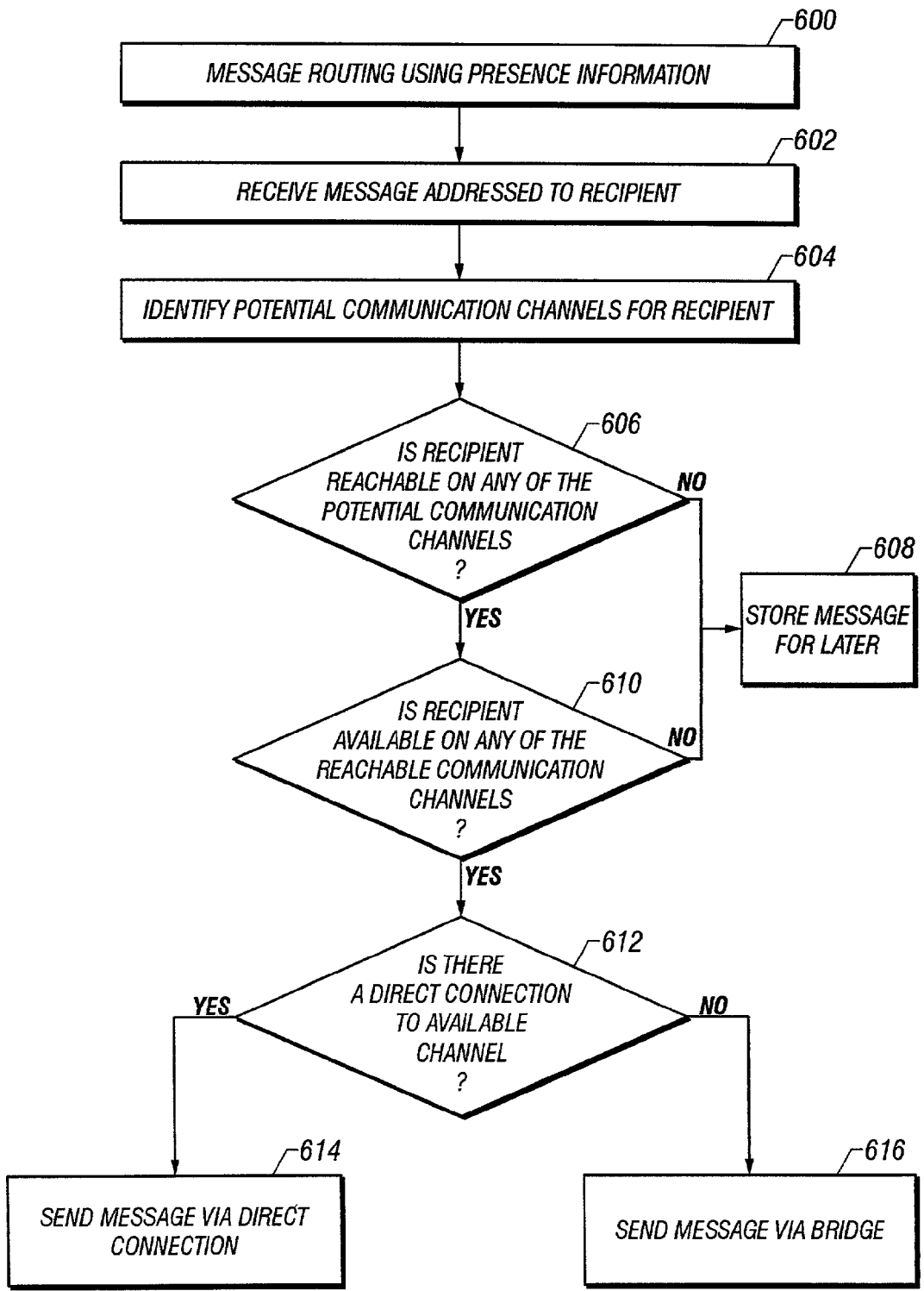
FIG. 6 is a flowchart of a process for routing messages using presence information.

FIG. 6 is a flowchart of a process 600 for message routing using presence information. In general, the process 600 seeks to route a message to a user in manner that represents an optimized solution to the following statement: the message is routed via one or more communications channels such that the message is (a) likely to reach the user, (b) in a timely manner, and/or (c) at a context-appropriate level of obtrusiveness. Different or additional routing criteria (e.g., urgency, redundancy, persistence, reliability, etc.) could be used in addition to, or in place of, these criteria, however.

First, the process 600 receives a message addressed to a Recipient, e.g., Rob (602). Next, the process 600 identifies Rob's potential communication channels, for example, by examining the Communication Channels 504 listed in structure 500 for user Rob (604).

Next, the process 600 determines whether Rob is reachable on one or more of his potential communication channels, for example, by examining the Reachable field 525 in the Accessibility State information 508 in structure 500 (606). If the process determines that Rob is not reachable on any of his communication channels, the message is stored for later, for example, to be delivered when one of Rob's communication channels becomes accessible (608).

Next, for each communication channel on which Rob is determined to be reachable, the process 600 determines whether Rob is available, for example, by examining the Available field 527 and/or the Other Indicia field 532 in the Accessibility State information 508 in structure 500 (610). If the process determines that Rob is not available on any of his reachable communication channels, the message is stored for later, for example, to be delivered when one of Rob's communication channels becomes reachable and available (608).

Lastly, if the process 600 determines that at least one of Rob's communication channels is both reachable and available, the process uses a direct connection, if available, to send the message (612, 614). Otherwise, a bridged connection is used to send the message (612, 616).

Various implementations of the systems and techniques described here may be realized in digital electronic circuitry, integrated circuitry, specially designed ASICs (application specific integrated circuits) or in computer hardware, firmware, software, or combinations thereof.

Other embodiments may be within the scope of the following claims.

What is claimed is:

1. A machine-implemented method comprising:
    discovering information relating to an accessibility state of one or more communication channels associated with a specific message recipient, wherein at least one of the communication channels is a bridged connection including at least one bridging device and a recipient device, and wherein the discovering information comprises interrogating at least one bridging device regarding the availability of a recipient device;
    maintaining a data repository comprising the accessibility state information discovered by said discovering and user preferences relating to user preferred message routing paths;
    storing user schedule information that defines a user schedule in the data repository; and
    routing a message addressed to the specific message recipient based on information in the data repository by using an intelligent routing decision that is based on a context appropriate level of obtrusiveness determined from a user's schedule at the time of the routing, based on the user schedule information.

2. The method of claim 1 wherein the accessibility state information discovered by said discovering includes information relating to whether the recipient is reachable via a communications channel.

3. The method of claim 1 wherein the accessibility state information discovered by said discovering includes information relating to whether the recipient is available via a communications channel.

4. The method of claim 1 wherein routing the message also comprises choosing one or more communications channels associated with the message recipient such that at least one of the following conditions is met: the message is likely to reach the message recipient or the message is likely to reach the message recipient in a timely manner.

5. The method of claim 1 wherein discovering information comprises receiving information from a communications service provider relating to at least one of the message recipient's communications status or activity.

6. The method of claim 1 wherein discovering information comprises receiving information from the message recipient relating to the message recipient's communications status.

7. The method of claim 1 further comprising providing a capability for a machine to receive from a message sender a device-independent identifier uniquely identifying the message recipient.

8. A method as in claim 1, wherein said accessibility state of one or more communication channels also includes interrogating at least an accessibility of each of a cellular phone, and an Internet based communication system.

9. A method as in claim 1, further comprising, prior to said discovering, forming a message that includes a device independent that uniquely identifies a specific recipient of the message, and using said identifier for said interrogating.

10. A computer readable storage medium, having machine-readable instructions for causing the machine to perform operations comprising:
    discover information relating to an accessibility state of one or more communication channels associated with a specific message recipient, wherein at least one of the communication channels is bridged connection including at least one bridging device and a recipient device, and wherein the discovering information comprises interrogating at least one bridging device regarding the availability of a recipient device;
    maintain a data repository comprising the accessibility state information discovered by said discover information operation and user preferences relating to user preferred message routing paths;
    store user schedule information that defines a user schedule in the data repository; and
    route a message addressed to the specific message recipient based on information in the data repository by using an intelligent routing decision that is based on a context appropriate level of obtrusiveness determined from a user's schedule at the time of the routing, based on the user schedule information.

11. The instructions of claim 10 wherein the accessibility state information discovered by said discover information operation includes information relating to whether the recipient is reachable via a communications channel.

12. The instructions of claim 10 wherein the accessibility state information discovered by said discover information operation includes information relating to whether the recipient is available via a communications channel.

13. The instructions of claim 10 wherein the instructions to route the message also comprise instructions to choose one or more communications channels associated with the message recipient such that at least one the following conditions is met: the message is likely to reach the message recipient or the message is likely to reach the message recipient in a timely manner.

14. The instructions of claim 10 wherein the instructions to discover information comprise instructions to receive information from a communications service provider relating to at least one of the messaqe recipient's communications status or activity.

15. The instructions of claim 10 wherein the instructions to discover information comprise instructions to receive information from the message recipient relating to the message recipient's communications status.

16. The instructions of claim 10 further comprising instructions to receive from a message sender a device-independent identifier uniquely identifying the message recipient.

17. A message-routing system comprising:
one or more discovery processes configured to discover information relating to an accessibility state of one or more communication channels associated with a specific message recipient who is specifically identified in a message, wherein at least one of the communication channel is a bridge connection including at least one bridging device and a recipient device, and wherein the discovering information comprises interrogating at least one bridging device regarding the availability of a recipient device;
a data repository comprising configured to store the accessibility state information discovered by said one or more discovery processes and user preferences relating to user preferred message routing paths, said data repository also configured to store user schedule information that defines a user schedule; and;
a message routing decision process configured to route the message addressed to the at least one bridging device to the message recipient using an intelligent routing decision that is based on a context appropriate level of obtrusiveness determined from a user's schedule at the time of the routing, based on the user schedule information.

18. The system of claim 17 wherein the message routing decision process is also configured to choose one or more communications channels associated with the message recipient such that at least one the following conditions is met: the message is likely to reach the message recipient, or the message is likely to reach the message recipient in a timely manner.

19. The system of claim 17 wherein the one or more discovery processes are configured to receive information from at least one of a communications service provider or from the message recipient relating to at least one of the message recipient's communications status or activity.

20. A machine-implemented method comprising:
discovering information relating to an accessibility state of one or more communication channels associated with a specific message recipient, wherein one or more of the communication channels is a bridged connection including at least one bridging device and a recipient device;
maintaining a data repository comprising the accessibility state information discovered by said discovering;
storing user schedule information that defines a user schedule in the data repository; and
routing a message addressed to the specific message recipient based on information in the data repository by using an intelligent routing decision that is based on a context appropriate level of obtrusiveness determined from a user's schedule at the time of the routing, based on the user schedule information.

21. A message-routing system comprising:
a reception unit configured to receive device-independent identifier uniquely identifying a specific message recipient;
one or more discovery processes configured to discover information relating to an accessibility state of one or more communication channels associated with the message recipient;
a data repository configured to store the accessibility state information discovered by said one or more discovery processes, said data repository also configured to store user schedule information that defines a user schedule in the data repository; and
a message routing decision process configured to route a message to the message recipient by using an intelligent routing decision that is based on a context appropriate level of obtrusiveness determined from a user's schedule at the time of the routing, based on the user schedule information.

* * * * *